C. L. GILL.
WIND MOTOR.
APPLICATION FILED FEB. 24, 1919.

1,359,693.

Patented Nov. 23, 1920.

INVENTOR.
Carl L. Gill
BY
W. W. Williamson
ATTORNEY.

UNITED STATES PATENT OFFICE.

CARL L. GILL, OF PHILADELPHIA, PENNSYLVANIA.

WIND-MOTOR.

1,359,693.  Specification of Letters Patent.  Patented Nov. 23, 1920.

Application filed February 24, 1919. Serial No. 278,746.

*To all whom it may concern:*

Be it known that I, CARL L. GILL, a citizen of Russia, residing at Philadelphia, in the county of Philadelphia and State of Pennsylvania, have invented new and useful Improvements in Wind-Motors, of which the following is a specification.

My invention relates to new and useful improvements in wind motors, and more particularly to a turbine adapted to be actuated by the wind for utilizing power thereof in propelling machinery or actuating other devices, the motion being transmitted from the wind motor to the device being operated by any suitable power transmission means such as for instance, belts and pulleys.

A further object of the invention is to provide a wind motor comprising a rotatable vertical shaft carrying a plurality of sets of blades, one set above another and each set consisting of a plurality of blades radiating from the vertical shaft and spaced equidistant apart about the same.

A further object of the invention is to provide a wind motor comprising a vertical shaft having a plurality of radiating blades spaced equally about said shaft, each of said blades so constructed as to form a section of a spiral.

With these ends in view, this invention consists in the details of construction and combination of elements hereinafter set forth and then specifically designated by the claims.

In order that those skilled in the art to which this invention appertains may understand how to make and use the same, I will describe its construction in detail referring by numerals to the accompanying drawings forming a part of this application, in which:—

Figure 1:
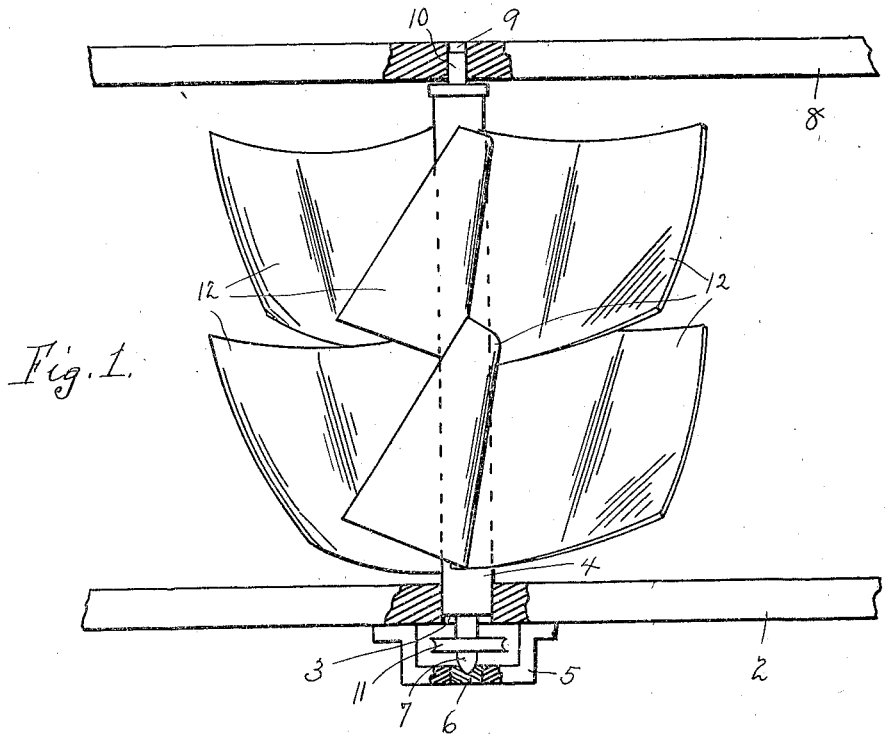
Figure 1, is a side elevation of wind motor embodying my invention.

In carrying out my invention as here embodied, 2 represents a lower supporting member having an opening 3 therethrough with which registers the vertical rotatable shaft 4 and this support preferably carries a bracket 5 or hanger depending from the underside thereof and carrying a suitable bearing 6 which is engaged by the pivot bearing bar 7 carried by the lower end of the shaft 4.

The upper support or guide member 8 is provided with an opening 9 directly above the opening 3 in the lower support 2 with which registers the trunnion 10 carried by the upper end of the rotatable shaft 4.

It is to be understood that the herein described parts used as bearings may be modified as desired and any well known and approved form of bearing may be used as these parts as shown are not essential to the proper operation of my device. On the vertical shaft 4 or the bearing bar 7, as here shown, may be mounted one of the members of the power transmission such as a groove pulley 11 here illustrated, but it is to be remembered that any suitable device may replace this pulley such as a gear wheel for instance.

Figure 2:
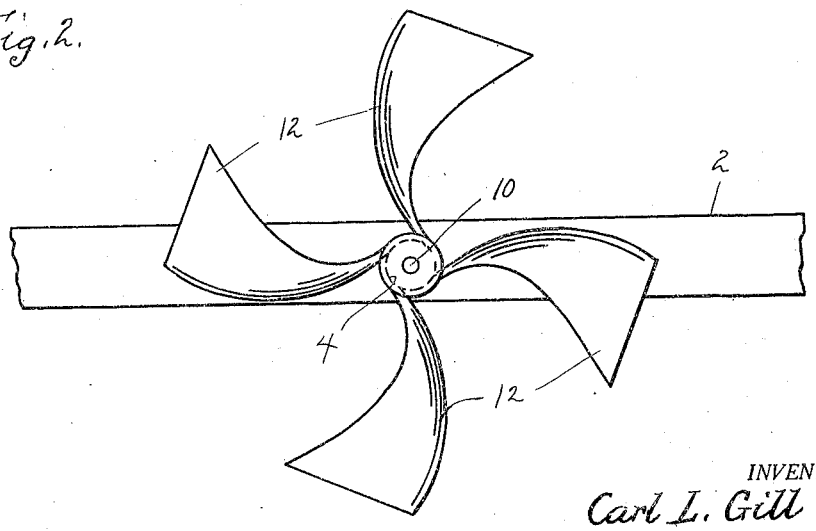
Fig. 2, is a plan view thereof with the upper supporting member removed.

On the rotatable shaft are mounted the blades 12 spaced equidistant apart about the shaft and radiating therefrom as plainly shown in Fig. 2 and these blades are preferably arranged in sets of four blades each and as many sets as desired may be used on the shaft, one set above another, as shown in Fig. 1, and the blades of one set may be in staggered relation if desired, although they are preferably arranged in vertical alinement, as here shown.

The blades are imperforate and are preferably formed from suitable sheet metal so bent that each blade forms a section of a spiral with the larger spread at the top and when the blades are in place, those of one set overlap the meeting edges of corresponding blades of the other set, while the lower edges of the blades of one set are spaced from the upper edges of corresponding blades of the other set an increasing distance from the vertical shaft outward.

By arranging the blades so that the upper edges of one set overlap the lower edges of the corresponding blades of the other set as above stated the currents of air striking the blades of the lower set will be baffled by said blades and guided toward succeeding blades of the other set so that said air currents will act upon one set of blades and then each succeeding set during their flow upward thereby greatly increasing the power of the motor.

The supports 2 and 8 may be fastened between poles or other suitable uprights and no matter what direction the wind blows, it will enter the pockets of some of the blades and start the device revolving after which it will enter the pockets of all of the blades successively at a certain point in their revolution and as it moves along the inclined pockets of said blades, it will cause them to be revolved with great speed and thereby giving sufficient power to the motor to run machinery or devices which may be run by other forms of power at the present time.

Of course I do not wish to be limited to the exact details of construction as herein shown, as these may be varied within the limits of the appended claims without departing from the spirit of my invention.

Having thus fully described my invention, what I claim as new and patentable is:—

1. A wind motor comprising a vertical rotatable shaft, a plurality of sets of blades on said shaft, one set above another so arranged that blades of one set overlap the corresponding blades of the adjacent set.

2. A wind motor comprising a vertical rotatable shaft and a number of sets of blades arranged so that the blades of one set overlap the corresponding blades of the adjacent set.

3. In a device of the character stated, a shaft, two sets of blades on said shaft, one set located above the other, and each set comprising a plurality of single blades of spiral form, the edges of the blades of one set overlapping the corresponding blades of the adjacent set.

In testimony whereof, I have hereunto affixed my signature.

CARL L. GILL.